United States Patent
Gottwald et al.

(10) Patent No.: US 9,432,141 B2
(45) Date of Patent: Aug. 30, 2016

(54) OPTICAL NETWORK UNIT, METHOD FOR PROCESSING DATA IN AN OPTICAL NETWORK AND COMMUNICATION SYSTEM

(75) Inventors: Erich Gottwald, Holzkirchen (DE); Harald Rohde, Munich (DE)

(73) Assignee: Xieon Networks S.a.r.l., Luxembourg (LU)

( * ) Notice: Subject to any disclaimer, the term of this patent is extended or adjusted under 35 U.S.C. 154(b) by 466 days.

(21) Appl. No.: 13/698,781

(22) PCT Filed: May 16, 2011

(86) PCT No.: PCT/EP2011/057852
§ 371 (c)(1),
(2), (4) Date: Nov. 19, 2012

(87) PCT Pub. No.: WO2011/144557
PCT Pub. Date: Nov. 24, 2011

(65) Prior Publication Data
US 2013/0058653 A1    Mar. 7, 2013

(30) Foreign Application Priority Data
May 19, 2010  (EP) .................................. 101 63 298

(51) Int. Cl.
*H04B 10/20* (2006.01)
*H04J 14/02* (2006.01)
(Continued)

(52) U.S. Cl.
CPC .......... *H04J 14/0279* (2013.01); *H04B 10/272* (2013.01); *H04J 14/0249* (2013.01); *H04Q 11/0067* (2013.01); *H04Q 2011/0064* (2013.01)

(58) Field of Classification Search
CPC ............. H04J 14/0249; H04J 14/0279; H04J 14/0258; H04J 3/1694; H04J 14/0245; H04J 14/02; H04J 14/0278; H04J 14/028; H04B 10/40; H04B 10/61; H04B 10/64; H04B 10/272; H04B 10/2503; H04B 10/505; H04B 10/611; H04Q 11/0067; H04Q 2011/0064; H04Q 2011/0018
USPC .......... 398/8, 66, 67, 69, 70–72, 204, 167.5, 398/135, 58, 60, 136, 137, 139
See application file for complete search history.

(56) References Cited

U.S. PATENT DOCUMENTS 5,052,051 A * 9/1991 Naito ..................... H04B 10/61
                                                    398/204
8,014,672 B2   9/2011 Suzuki et al.
(Continued)

FOREIGN PATENT DOCUMENTS

EP   1 892 870 A1   2/2008
EP   1 978 653 A1   10/2008

OTHER PUBLICATIONS

International Preliminary Report on Patentability, PCT/EP2011/057852, dated Nov. 20, 2012, 7 pages.
(Continued)

*Primary Examiner* — Hibret Woldekidan
(74) *Attorney, Agent, or Firm* — Nelson Mullins Riley & Scarborough LLP

(57) ABSTRACT

An optical network unit has a tunable laser. The tunable laser is tunable such that a point-to-point connection to another optical network unit is established via an optical fiber. There is also provided a method for processing data in an optical network and a corresponding communication system. The tunable laser can be adjusted based on a detected collision, and a frequency grid can be supplied from a centralized component.

15 Claims, 8 Drawing Sheets

(51) Int. Cl.
*H04B 10/272* (2013.01)
*H04Q 11/00* (2006.01)

(56) References Cited

U.S. PATENT DOCUMENTS

| | | | | |
|---|---|---|---|---|
| 8,824,889 | B2* | 9/2014 | Effenberger | H04J 14/0282 398/67 |
| 9,002,203 | B2* | 4/2015 | Treyer | H04B 10/60 398/115 |
| 9,014,573 | B2* | 4/2015 | Rohde | H04B 10/60 398/204 |
| 2004/0179855 | A1 | 9/2004 | Harada | |
| 2004/0197099 | A1* | 10/2004 | Kai | H04B 10/572 398/85 |
| 2004/0264963 | A1* | 12/2004 | Kani | H04J 14/0226 398/72 |
| 2007/0122152 | A1* | 5/2007 | Matthews | 398/71 |
| 2008/0085118 | A1 | 4/2008 | Effenberger | |
| 2008/0279567 | A1* | 11/2008 | Huang | H04J 14/0227 398/168 |
| 2011/0103791 | A1* | 5/2011 | Umnov et al. | 398/1 |
| 2011/0103793 | A1* | 5/2011 | Collings | H04B 10/07955 398/37 |
| 2012/0033974 | A1 | 2/2012 | Ikai et al. | |
| 2012/0093502 | A1* | 4/2012 | Gottwald | H04B 10/27 398/27 |
| 2012/0230672 | A1* | 9/2012 | Gottwald | H04B 10/611 398/7 |

OTHER PUBLICATIONS

International Search Report and Written Opinion, PCT/EP2011/057852, dated Sep. 19, 2011, 10 pages.

* cited by examiner

OPTICAL NETWORK UNIT, METHOD FOR PROCESSING DATA IN AN OPTICAL NETWORK AND COMMUNICATION SYSTEM

BACKGROUND OF THE INVENTION

Field of the Invention

The invention relates to an optical network unit, a method for processing data in an optical network and to a communication system.

In fiber-optic communications, wavelength-division multiplexing (WDM) is a technology which multiplexes multiple optical carrier signals on a single optical fiber by using different wavelengths (colors) of laser light to carry different signals. This allows for a multiplication in capacity, in addition to enabling bidirectional communications over one strand of fiber.

WDM systems are divided into different wavelength patterns, conventional or coarse and dense WDM. WDM systems provide, e.g., up to 16 channels in the 3rd transmission window (C-band) of silica fibers of around 1550 nm. Dense WDM uses the same transmission window but with denser channel spacing. Channel plans vary, but a typical system may use 40 channels at 100 GHz spacing or 80 channels at 50 GHz spacing. Some technologies are capable of 25 GHz spacing. Amplification options enable the extension of the usable wavelengths to the L-band, more or less doubling these numbers.

Optical access networks, e.g., a coherent Ultra-Dense Wavelength Division Multiplex (UDWDM) network, are deemed to be the future data access technology.

Within the UDWDM concept, potentially all wavelengths are routed to each ONU. The respective wavelength is selected by the tuning of the local oscillator (LO) laser at the ONU.

Data centers or server farms may host up to several tens of thousands of servers. The interconnection of these servers is a considerable challenge due to the amounts of data to be processed and the high degree of reliability required.

Such data centers may preferably be organized in a hierarchical manner. For example, several servers are combined to a rack and several such racks are combined to a cluster.

Within the rack, the servers require fast network connections to convey data between each other; the racks are connected with each other as well. Such interconnection is further required for clusters and also between different data centers. The bandwidth decreases per hierarchy level by a magnitude.

BRIEF SUMMARY OF THE INVENTION

The problem to be solved is to provide a solution that allows for an efficient interconnection and/or data transfer between various hierarchically deployed components of a network topology.

This problem is solved according to the features of the independent claims. Further embodiments result from the depending claims.

In order to overcome this problem, an optical network unit (ONU) is provided
comprising a tunable laser;
wherein the tunable laser is tunable such that a point-to-point connection to another optical network unit is established via an optical fiber.

Hence, two optical network units can establish a (direct) connection with each other without the user traffic being conveyed across an optical line termination (OLT) or any other centralized optical network element. A centralized component, if provided, does not require to be attached to the optical network, but may convey signaling and/or administrative information via electrical or wireless connection that may be separate from the optical network. Also, the centralized component could be attached to the optical network and convey said signaling and/or administrative information via the optical fiber.

It is noted that several ONU connections (also referred to as channels), each comprising an ONU-ONU pair, share a single optical fiber, wherein the connections may preferably use different wavelength bands (frequency ranges) to avoid interfering with each other.

In an embodiment, the point-to-point connection uses a wavelength band in particular for conveying coherent, heterodyne signals using an intermediate frequency.

Hence, the optical network unit comprises a heterodyne receiver that is supplied by the tunable laser. The tunable laser is also used as a local oscillator for modulating the data signal conveyed towards the optical network.

The optical network unit may be a WDM ONU or an UDWDM ONU.

In another embodiment, the ONU comprises a processing unit that is arranged to detect a pending or an occurring collision and adjusts the tunable laser to avoid or reverse said collision.

Hence, the (digital signal) processing unit can be used to detect the collision before it occurs or after (when) it occurred. In such case, the tunable laser can be adjusted away from the collision.

In a further embodiment, the tunable laser is adjusted towards a center of the band used for the connection, wherein such adjustment is conducted either in smaller steps and/or with a higher delay between the steps compared to an adjustment of the tunable laser towards the boundary of said band.

Hence, in case one of the ONUs detects (via the processing unit) that it reaches or approaches a maximum or minimum wavelength (i.e. the boundary) of the tuning range, it may slowly move (e.g., applying small frequency steps with pauses in between them, each pause preferably being long enough for the other ONUs to avoid wavelength collision) towards the center of the available tuning range (wavelength band). This way the ONU bounces back from the boundary with said small frequency steps and the adjacent ONUs may adjust to this ONU's motion accordingly.

In a next embodiment, the optical network unit is also connected to a centralized component.

The centralized component can also be referred to as an admin(istration) instance. The centralized component may comprise the hardware of the optical network unit. Also, the centralized component may be realized as an OLT.

It is noted that the communication with the centralized component and the at least one optical network unit could be conducted via the optical network to which the centralized component is connected as a peer component.

As an alternative, the centralized component can be connected with the optical network unit via a different channel, e.g., purely electrical, via a carrier and/or via a wireless network. The centralized component may be realized as at least one administration entity. It is further noted that several such administration entities could be regarded as centralized component.

The centralized component may hence support establishing a connection, but does not have to be involved in the point-to-point communication between the optical network units. In particular, the user traffic between the optical network units sharing a connection is not conveyed across this centralized component.

It is also an embodiment that the centralized component supplies a frequency grid.

This frequency grid could be regarded as a frequency comb providing comb lines, wherein a wavelength band between two adjacent comb lines is used by a communication channel or connection between two optical network units.

Pursuant to another embodiment, an identifier is associated with each element of the frequency grid.

Hence, the wavelength range associated with the element of the grid can be unambiguously identified by such identifier. This can be used for addressing the particular elements of the grid, e.g., for assigning portions of the frequency grid to a particular connection or channel.

It is noted that the elements of the frequency grid can be maintained by the centralized component, i.e. the centralized component may be aware of the elements that are currently used or free for allocation. Hence, the centralized component may allocate such elements of the frequency grid based on the request from a particular optical network unit that wants to establish a point-to-point connection with another optical network unit.

According to an embodiment, the ONU comprises a processing unit which determines an approaching boundary of the frequency grid.

Hence, an approaching comb line can be detected by such (digital signal) processing unit that could be deployed with the optical network unit. Also, reaching such comb line (exceeding the frequency grid assigned for the particular channel or connection) could be detected. As a consequence, the tunable laser can be adjusted accordingly to maintain within the frequency grid, i.e. the wavelength range that is to be used for a particular connection between two optical network units.

According to another embodiment, the optical network unit is assigned to a parking frequency in a standby mode, wherein the parking frequency is in particular determined by a frequency of the centralized component and an intermediate frequency.

Hence, the optical network unit could be an addressee in a connection that has been requested by another optical network unit. The centralized component provides the services of finding the addressee (by a request that could be broadcast towards several optical network units that are in the standby mode) and indicating an available resource that could be used for the actual connection.

In yet another embodiment,
  the optical network unit receives a message from the centralized component indicating that a connection with another optical network unit is to be set up;
  the tunable laser is adjusted to a predetermined frequency.

It is noted that the predetermined frequency may be conveyed via said message received from the centralized component. As an alternative, the predetermined frequency can be determined by the optical network unit (based on a pre-defined mechanism). The predetermined frequency may be determined based on a multiple of the intermediate frequencies.

According to a next embodiment,
  the tunable laser is adjusted to a frequency that can be used for communicating with the centralized component;
  the optical network unit conveys an addressee information to the centralized component;
  the optical network unit adjusts its tunable laser to a frequency to be used for the connection with the optical network unit addressed.

It is noted that the optical network unit may be informed by the centralized component about the frequency that can be used for the connection with the optical network unit addressed. As the optical network units are spaced by an intermediate frequency, the frequency used by the addressee is sufficient to adjust the tunable laser of the optical network unit that requested the connection with the addressee (i.e. the frequency used by the addressee plus the intermediate frequency).

The problem stated above is also solved by a method for processing data in an optical network,
  wherein a tunable laser of an optical network unit is adjusted such that a point-to-point connection to another optical network unit is established via an optical fiber.

It is noted that all the features described above apply to this method accordingly.

Furthermore, the problem stated above is solved by a communication system comprising at least one device as described herein.

According to an embodiment, the communication system further comprises a centralized component that is connected to the at least one optical network unit.

Pursuant to another embodiment, the centralized component is connected to the at least one optical network unit via an optical network or via an electrical connection or network and/or a wireless network.

Hence, the centralized component can be connected to the at least one ONU via a separate network or connection other than the optical network.

It is noted that the centralized component provides signaling and/or administrative services to the at least one ONU.

DESCRIPTION OF THE INVENTION

The approach presented in particular reduces a bandwidth bottleneck between racks or clusters by an optical network architecture. The racks or clusters are hierarchically deployed components of a network, i.e. the cluster may comprise several racks, wherein each rack comprises several servers.

Figure 1:
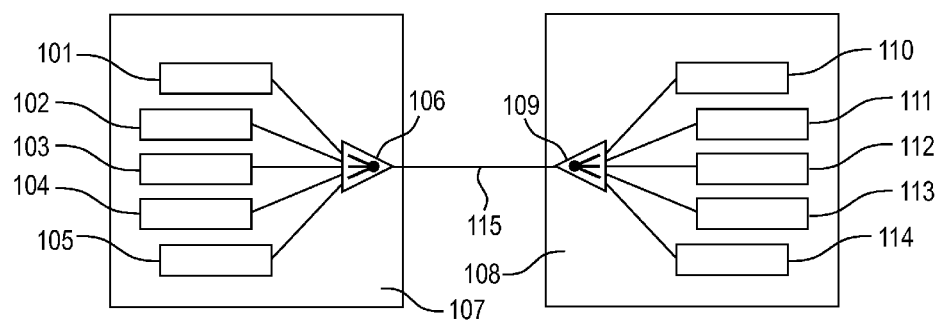
FIG. 1 shows a schematic block structure of network components comprising the hierarchically deployed components clusters, racks, severs.
Figure 1:
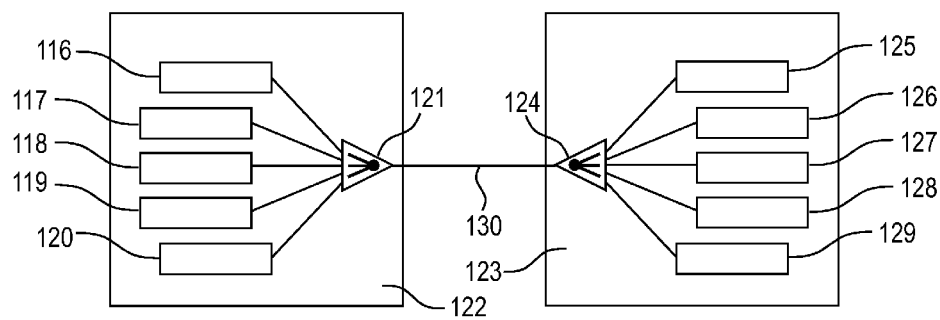

FIG. 1 shows a schematic block structure of the components of the network comprising the hierarchically deployed components clusters, racks, and severs. In addition, several clusters may be arranged as data centers, which also convey data between each other.

Pursuant to FIG. 1, a set of servers 101 to 105 deployed in a rack 107 is connected via an optical splitter or combiner 106 to another rack 108, i.e. a splitter or combiner 109 that is connected to a set of servers 110 to 114. The connection between the racks 107 and 108 is conducted by a single optical fiber 115.

In the next hierarchy level, a set of racks 116 to 120 of a cluster 122 is connected via a splitter 121 to an optical fiber 130 that is connected to a splitter 124 of a cluster 123, which comprises a set of racks 125 to 129 that is connected to said splitter 124.

This architecture enables simultaneous communication of a large number of servers or racks within a data center over a single optical fiber.

Figure 5:
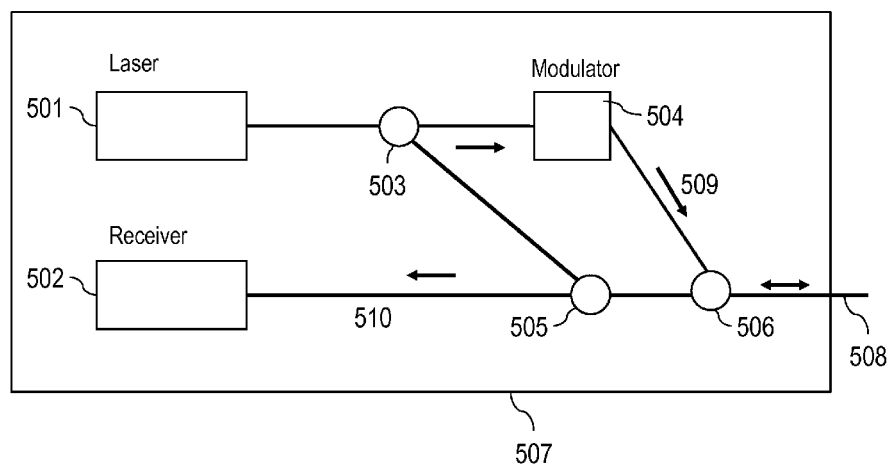
FIG. 5 shows an arrangement comprising a local oscillator laser, splitters, a modulator and a receiver, wherein such components could be part of an ONU.

The optical terminals connected to the optical fibers can be UDWDM ONUS. An exemplary embodiment of such a UDWDM ONU is shown in FIG. 5. Each server comprises at least one such ONU.

FIG. 5 shows an ONU 507 comprising a local oscillator laser 501, splitters 503, 505 and 506, a modulator 504 and a receiver 502. An optical fiber 508 can be connected to an optical network component, e.g., a splitter or combiner (not shown in FIG. 5).

The signal generated at the local oscillator laser 501 is modulated via the modulator 504 to produce an upstream data signal 509 to be conveyed via the optical fiber 508. An incoming optical signal via the fiber 508 is fed to the receiver 502. Also, the signal generated at the local oscillator laser 501 is fed via splitters 503 and 505 to the receiver 502. Hence, the local oscillator laser 501 is used for modulation purposes to transmit the signal from the ONU 507 to a destination as well as for reception purposes regarding the incoming received signal 510. For the latter purpose, the wavelength of the local oscillator laser 501 can be adjusted to the wavelength of the incoming signal.

The solution suggested herein does not require any OLT to which the ONU(s) is/are connected. Instead, the ONUS can be connected with each other. Based on the communication load or demand, each server may communicate with another server at the other side on the optical link. Thus, flexible point-to-point connections can be realized via an adequate wavelength tuning at the ONUS.

UDWDM ONUS may not comprise a stabilized laser source. Thus, the frequency of the ONU's light source or laser may drift. As many ONU pairs are on the same fiber, frequency collisions may occur. However, there are several approaches to avoid such frequency collisions, in particular:

a) An optical comb source (comprising several comb lines, each at a particular frequency) may distribute a number of equally spaced optical wavelengths bi-directionally into the fiber. The spectral distance between the comb lines may be substantially equidistant and may amount to a frequency within the range from 3 GHz to 100 GHz, in particular 25 GHz or 50 GHz.

Each ONU-ONU pair (i.e. connection between two ONUS, also referred to as channel) may preferably utilize a frequency range between two adjacent comb lines and may drift between the adjacent comb lines. Each ONU may comprise a processing unit (preferably a digital signal processing unit), which detects a laser frequency approaching the frequency of a comb line and adjusts the laser frequency such that a collision with the comb line is avoided. Thus, the processing unit provides a spectral separation functionality.

Figure 2:
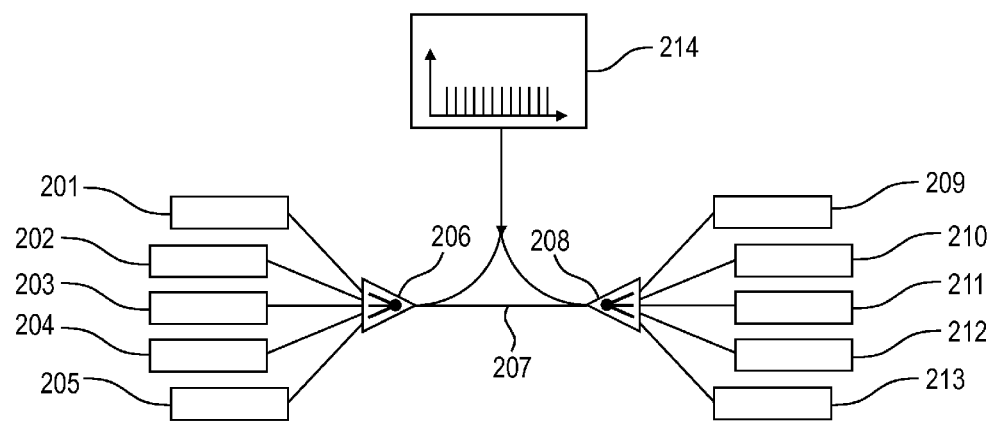
FIG. 2 shows several servers that are connected to a splitter and via an optical fiber to another splitter to which several servers are connected, wherein an optical comb source is connected to the optical fiber, i.e. providing or distributing optical wavelengths in both directions towards the splitters.

FIG. 2 shows several servers 201 to 205 that are connected to a splitter 206 and further via an optical fiber 207 to a splitter 208 to which several servers 209 to 213 are connected. Each server comprises an ONU, wherein two ONUS may communicate with each other using at least one optical bandwidth assigned to such ONU pair. Further, an optical comb source 214 is connected to the optical fiber, i.e. providing or distributing optical wavelengths in both directions towards the splitter 206 as well as the splitter 208 onto the fiber 207. The optical comb source 214 may be a centralized component maintained by an administration (also referred to as an admin instance).

b) It is also possible that all ONU-ONU pairs are free-drifting across the frequency band. If any pair (connection) is about to collide or actually collides with another pair (connection), this could be detected by a (digital signal) processing unit within the ONUS. The processing unit adjusts the frequency utilized by the light sources (lasers) such that the collision is avoided or reversed.

c) Based on the approach described under b) above, additional measures can be provided to prevent an ONU from forcing all other ONUS or a portion thereof to move to an upper or a lower boundary of the available tuning range. Hence, in case one of the ONUS detects (via the processing unit) that it reached or approaches a maximum or minimum wavelength of the tuning range, it may slowly move (e.g., applying small frequency steps with pauses in between them, each pause preferably being long enough for the other ONUS to avoid wavelength collision) towards the center of the available tuning range (wavelength band). This way the ONU bounces back from the boundary with said small frequency steps and the adjacent ONUS also adjust to this ONU's motion within the available tuning range.

If a defect ONU blocks the tuning, i.e., is not able to move its frequency band, the ONU adjacent to this defect ONU may make a bigger frequency step large enough to overcome the wavelength barrier caused by this defect ONU. In other words, the moving ONU may skip the fixed frequency range of the defect ONU.

Hence, advantageously, at least two indication points of a pending collision can be determined: Two different measurement values indicating a strength of an undesired beat signal caused by an adjacent channel (of the defect ONU) with a frequency spacing that is considered too close. Hence, by comparing successive timeslots of measurements, it can be determined whether the adjacent ONU's frequency range is getting closer, remaining at a constant distance or moving away.

Figure 3:
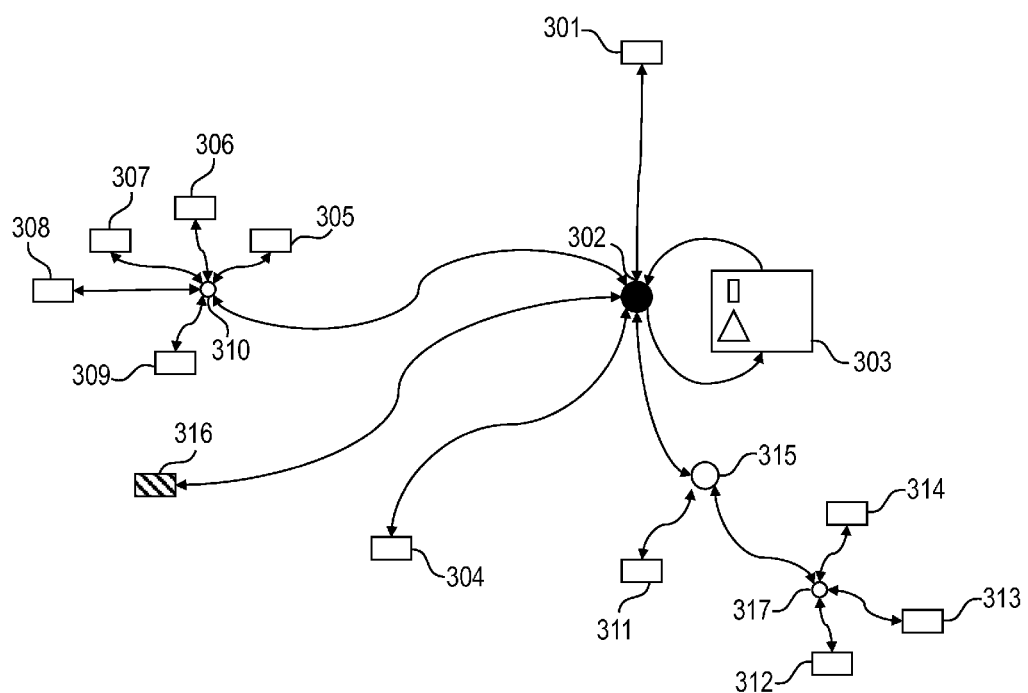
FIG. 3 shows a topology/architecture of a communication network comprising several ONUS and a centralized component (admin instance) connected to a star coupler.

FIG. 3 shows a topology or architecture of a communication network. An ONU (in particular a server or a component of the communication network, e.g., subscriber) is connected to a star coupler 302. The star coupler 302 comprises a fiber loop with an optical amplifier and an optical isolator, combined as a unit 303; the star coupler 302 can thus be regarded as an amplified star coupler.

An ONU 304 is connected to the star coupler 302. ONUS 305 to 309 are connected to a splitter 310 that is connected to the star coupler 302. ONUS 312 to 314 are connected to a splitter 317, which is connected to a splitter 315. Also, an ONU 311 is connected to the splitter 315. The splitter 315 is further connected to the star coupler 302.

In addition, an administration instance 316 (e.g., an OLT) is connected to the star coupler 302. Coupling the administration instance 316 is a mere option and not required for the communication network. The administration instance 316 may comprise the same hardware as the ONU used in FIG. 3.

The topology shown in FIG. 3 can be implemented as an UDWDM network, which can be used for connecting data centers (with several racks each comprising several servers, see above) or as a virtual point-to-point network with N subscribers based on 2:N splitters (see splitters 310, 315 and 317) or 1:N splitters. The 1:N splitter scenario in particular requires a reflective type amplifier instead of a unidirectional amplifier (with optical isolator). It is noted that the (amplifying) unit 303 may be deployed on the splitter side with 1 or 2 connectors (not at the side comprising the N connectors).

A signal used for communication in the topology of FIG. 3 may be a coherent, heterodyne signal with an intermediate frequency (IF).

Next, an exemplary implementation of the setup and operation of such a communication network comprising several ONUs will be described.

Figure 4A:
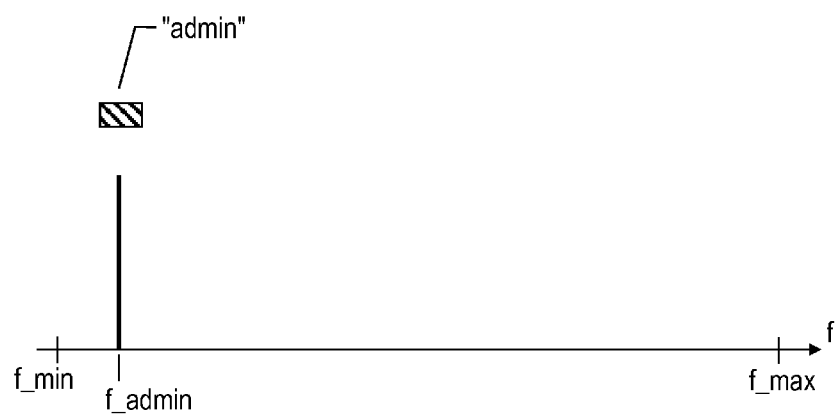
FIG. 4A shows an initial state of a frequency allocation with an admissible wavelength band between a minimum and a maximum frequency.

(1) Initial State:
  (a) In an initial state as shown in FIG. 4A, a frequency f_admin that is close to a frequency f_min (or alternatively close to a frequency f_max) is used, wherein a frequency range between the frequency f_min and the frequency f_max is considered as an admissible wavelength band.
  (b) The transmitter of the admin instance is activated at said frequency f_admin. It is noted that the admin instance may be a centralized component of the optical network, e.g., an OLT.

(2) Adding a subscriber (ONU):
  (a) A new subscriber ONU_j scans for a "parking" position at a frequency $$f\_park = f\_admin - IF$$

with its transmitter being switched off (TX=OFF). The intermediate frequency IF is known at the subscriber ONU_j. Hence, the parking position can be determined by detecting the frequency f_admin.
  (b) The receiver of the subscriber ONU_j is switched on (RX=ON).
  (c) The transmitter of the subscriber ONU_j is switched on (TX=ON) in case the ONU_j is tuned to the parking frequency f_park, i.e. if the frequency f_j adjusted at the subscriber ONU_j reaches the parking frequency, i.e.

$$f\_j == f\_park.$$

The subscriber ONU_j then registers with the admin instance.
  (d) After the registration, the transmitter of the subscriber ONU_j is switched off (TX=OFF).

Figure 4B:
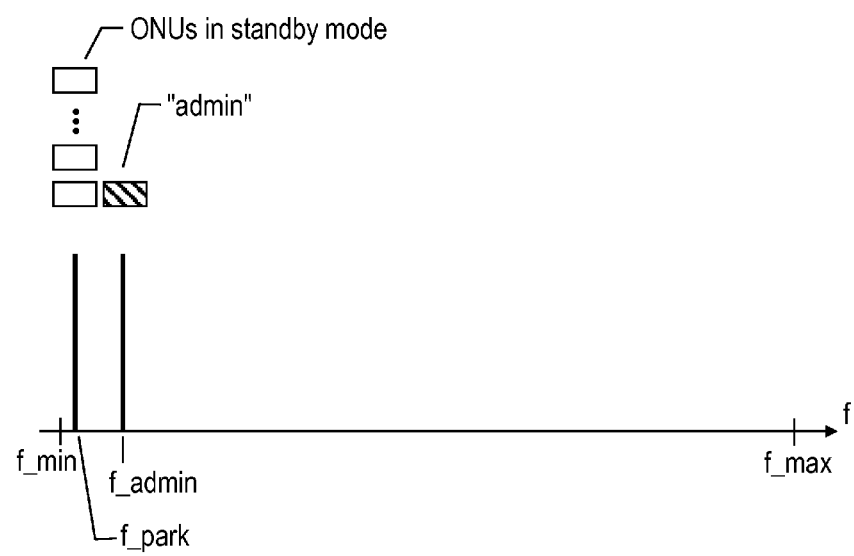
FIG. 4B shows the admissible wavelength band of FIG. 4A with several subscribers (ONUS) in a standby mode registered at a parking frequency f_park.

FIG. 4B shows several subscribers (ONUs) in a standby mode registered at the parking frequency f_park. The ONUs in standby mode are not participating in an ONU-ONU communication (yet). It is noted that each ONU may have an individual (e.g., unique) identifier.

In case of a collision, i.e. in case at least two ONUs try to conduct registration at the same time, the admin instance may send a repeat command instructing these ONUs to conduct their registration again. Hence, all ONUs in the parking position or in a dialing state switch off their transmitters (TX=OFF) and try again (TX=ON) after a time delay that is determined by a random time delay generator at each ONU. Due to the random time delay, the ONUs will most likely not restart at the same time and the collision is solved.

(3) Dial switching demand:
  (a) In order to provide an ONU-ONU connection, a subscriber ONU_x moves from the parking position at the frequency f_park to a "dialing" position at a frequency $$f\_x = f\_admin + IF.$$

The transmitter of the subscriber ONU_x is still switched off (TX=OFF).
  (b) The transmitter of the subscriber ONU_x is switched on (TX=ON) and the subscriber ONU_x communicates with the admin instance and selects a partner subscriber ONU_j as addressee for the ONU-ONU connection.
  (c) The transmitter of the subscriber ONU_x is switched off (TX=OFF).
  (d) The admin instance broadcasts a data link request comprising the identity of the subscriber ONU_j to which the subscriber ONU_x wants to be connected.
  (e) The subscriber OLT_j is in standby mode at the frequency f_park and receives a data link request.

Figure 4C:
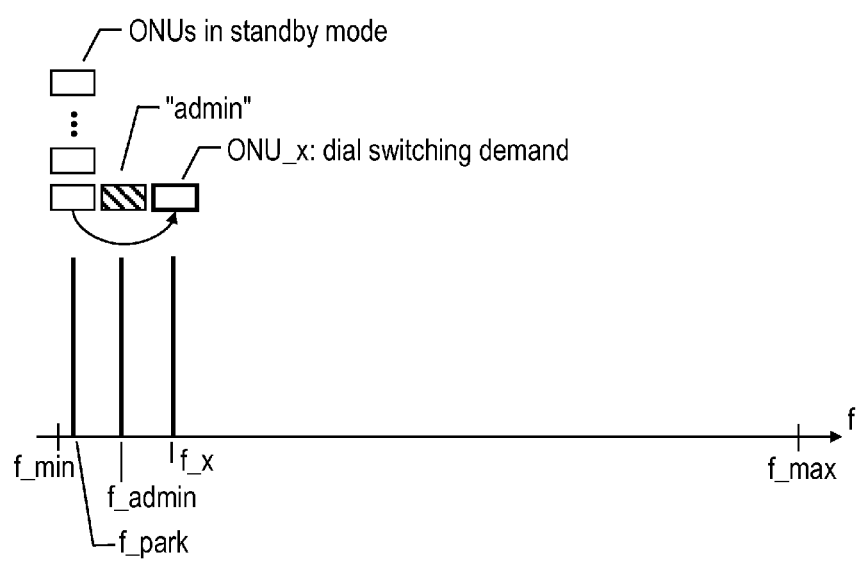
FIG. 4C shows the admissible wavelength band of FIG. 4B with a subscriber ONU_x being transferred from the parking frequency f_park to a dialing position at a frequency f_x.

FIG. 4C visualizes the transfer of the subscriber ONU_x from the standby mode to the dialing position at the frequency f_x.

(4) Establishing an ONU-ONU connection (dial-up):
  (a) The transmitter of the subscriber ONU_j is (still) switched off (TX=OFF). The ONU_j scans for a free wavelength slot and moves to such slot located at a frequency $$f\_j = f\_admin + k*3*IF,$$

with
  k=1, . . . , n.
  The free wavelength slot can be determined without a frequency comb (i.e. without a fixed grid of predefined frequency bands). In this example, the frequency distance between caller-callee pairs (connections or channels) may amount to three times the intermediate frequency (3IF). In such case, a frequency-distance detector with a range from the intermediate frequency IF to about 4IF may be provided.
  (b) The transmitter of the subscriber ONU_j is switched on (TX=ON), the subscriber ONU_j is in a wait state at the frequency f_j.

(c) The transmitter of the subscriber ONU_x is off (TX=OFF) and the subscriber ONU_x (at frequency f_x) scans to the frequency $$f\_jx = f\_j + IF.$$

The subscriber ONU_x locks to the subscriber ONU_j. The ONU_x may find the frequency f_j of the ONU_j by scanning the available frequency band for the (unique) identification of the ONU_j. As an alternative, the ONU_x may be informed by the admin instance about the frequency f_j of the ONU_j.

(d) The transmitter of the subscriber ONU_x is switched on (TX=ON).

(e) A data connection between the subscriber ONU_x and the subscriber ONU_j can be established.

Figure 4D:
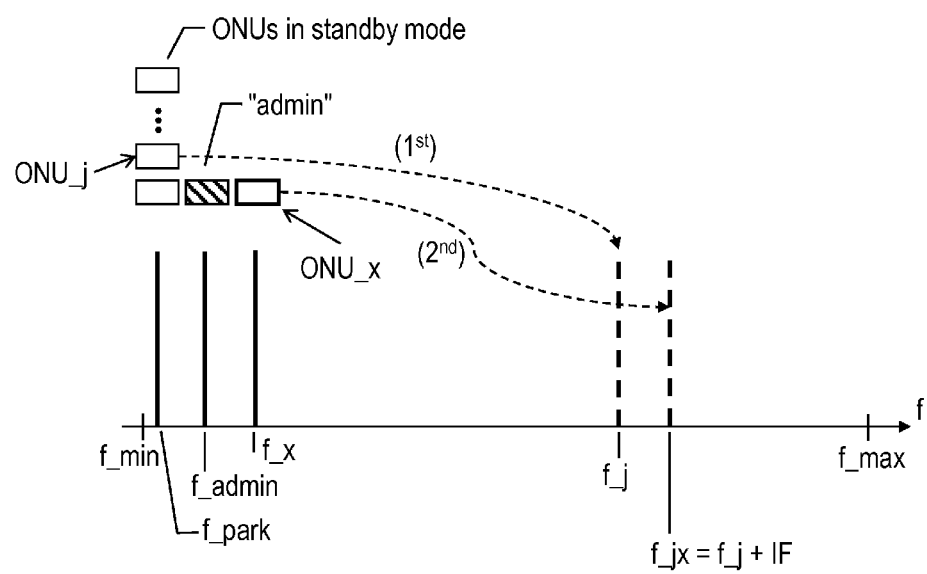
FIG. 4D shows the admissible wavelength band of FIG. 4C with an ONU_j being moved to a frequency f_j and a caller ONU_x being moved to a frequency f_j+IF=f_jx.

FIG. 4D visualizes a dial-up. The callee ONU_j moves to the frequency f_j and the caller ONU_x moves to the frequency f_j+IF=f_jx. Then, the data connection can be established. It is noted that according to the example shown in FIG. 4D, the first connection is established at a frequency f_j=3IF for the first callee; the next connection may lead to a callee moving to a frequency of 6IF, etc. The frequency range or distance between the callee and callers amounts to 3IF.

(5) Terminating a connection:
  (a) Both subscribers ONU_x and ONU_j switch off their transmitter (TX=OFF).
  (b) Both subscribers ONU_x and ONU_j adjust their frequency to the parking frequency f_park.
  (c) Both subscribers ONU_x and ONU_j send a message (TX=ON) to the admin instance indicating that both ONUs no longer occupy a frequency range.
  (d) Both subscribers ONU_x and ONU_j switch off their transmitter (TX=OFF).

(6) Connection failure:
  If no connection can be established after a predetermined period of time, a timeout is determined and the connection is terminated. This is indicated to the admin instance and the ONUs affected are reset to the parking frequency f_park (see step (5) above).

This approach can be combined with a frequency comb providing frequency slots. In such case, identifiers may be modulated on each spectral line of the comb, e.g., by a (low individual frequency) amplitude modulation. The broadcast message issued by the admin instance in step (3)(d) may thus assign the identifier of the free frequency position f_j of the frequency comb.

LIST OF ABBREVIATIONS

IF Intermediate Frequency
OLT Optical Line Termination
ONU Optical Network Unit
UDWDM Ultra-Dense WDM
WDM Wavelength Division Multiplex

The invention claimed is:

1. An optical network unit, comprising:
    a receiver,
    a modulator,
    a tunable laser arranged for generating a local oscillator signal, the tunable laser being connected to said modulator and to said receiver, such that said local oscillator signal is fed both to the modulator and to the receiver,
    wherein the receiver is arranged, such that both the local oscillator signal of the tunable laser and an incoming data signal from another optical network unit are fed to said receiver,
    wherein the modulator is arranged for data modulating the local oscillator signal of said tunable laser to produce a data signal to be conveyed via an optical fiber,
    said tunable laser being tunable for establishing a point-to-point connection to said another optical network unit via said optical fiber by adjusting the wavelength of the local oscillator signal to the wavelength of said incoming data signal, and
    a processing unit configured to detect a pending or an occurring frequency collision and to adjust said tunable laser of said optical network unit to avoid or reverse the frequency collision.

2. The optical network unit according to claim 1, wherein the point-to-point connection is a connection employing a wavelength band for conveying coherent, heterodyne signals using an intermediate frequency.

3. The optical network unit according to claim 1, wherein the tunable laser is adjusted towards a center of the band employed in the connection, and the adjustment is effected either in smaller steps and/or with a higher delay between the steps compared to an adjustment of said tunable laser towards a boundary of the band.

4. The optical network unit according to claim 1, wherein the optical network unit is also connected to a centralized component as a peer component.

5. The optical network unit according to claim 4, wherein the centralized component supplies a frequency grid.

6. The optical network unit according to claim 5, wherein an identifier is associated with each element of the frequency grid.

7. The optical network unit according to claim 5, further comprising a processing unit configured to determine an approaching boundary of the frequency grid.

8. The optical network unit according to claim 4, wherein the optical network unit is assigned to a parking frequency in a standby mode.

9. The optical network unit according to claim 8, wherein the parking frequency for the standby mode is determined by a frequency of the centralized component and an intermediate frequency.

10. The optical network unit according to claim 8, wherein:
    the optical network unit receives a message from the centralized component indicating that a connection with another optical network unit is to be set up; and
    said tunable laser is adjusted to a predetermined frequency.

11. The optical network unit according to claim 8, wherein:
    said tunable laser is adjusted to a frequency that can be used for communicating with the centralized component;
    the optical network unit conveys an addressee information to the centralized component; and
    the optical network unit adjusts said tunable laser to a frequency to be used for the connection with the optical network unit addressed.

12. A communication system, comprising at least one optical network unit according to claim 1.

13. The communication system according to claim 12, further comprising a centralized component connected to said at least one optical network unit.

14. The communication system according to claim 13, wherein said centralized component is connected to said at least one optical network unit via an optical network or via an electrical connection or network and/or a wireless network.

15. A method for processing data in an optical network, the method comprises:
- generating a local oscillator signal with a tunable laser comprised in an optical network unit,
- feeding the local oscillator signal both to a modulator and to a receiving unit both comprised in said optical network unit,
- feeding an incoming data signal from another optical network unit to said receiver,
- data modulating the local oscillator signal of said tunable laser with via said modulator to produce a data signal to be conveyed via an optical fiber,
- adjusting said tunable laser by adjusting the wavelength of the local oscillator signal to the wavelength of said incoming data signal, such that a point-to-point connection to said another optical network unit is established via said optical fiber,
- detecting a pending or an occurring frequency collision, and
- adjusting said tunable laser to avoid or reverse the frequency collision.

\* \* \* \* \*